US006894837B2

(12) United States Patent
Dobschal et al.

(10) Patent No.: US 6,894,837 B2
(45) Date of Patent: May 17, 2005

(54) IMAGING SYSTEM FOR AN EXTREME ULTRAVIOLET (EUV) BEAM-BASED MICROSCOPE

(75) Inventors: Hans-Juergen Dobschal, Kleinromstedt (DE); Thomas Scheruebl, Jena (DE); Robert Brunner, Jena (DE); Norbert Rosenkranz, Reichenbach (DE); Joern Greif-Wuestenbecker, Marburg (DE)

(73) Assignee: Carl Zeiss Microelectric Systems GmbH, Jena (DE)

( * ) Notice: Subject to any disclaimer, the term of this patent is extended or adjusted under 35 U.S.C. 154(b) by 0 days.

(21) Appl. No.: 10/626,130

(22) Filed: Jul. 24, 2003

(65) Prior Publication Data

US 2004/0212891 A1 Oct. 28, 2004

(30) Foreign Application Priority Data

Apr. 25, 2003 (DE) ........................................ 103 19 269

(51) Int. Cl.[7] ................................................ G02B 21/00

(52) U.S. Cl. ........................ 359/566; 359/572; 359/570; 359/574; 378/43

(58) Field of Search ................................ 359/566, 572, 359/570, 574; 378/43, 70, 145

(56) References Cited

U.S. PATENT DOCUMENTS

| | | | | |
|---|---|---|---|---|
| 5,022,064 A | | 6/1991 | Iketaki | |
| 5,131,023 A | | 7/1992 | Yasugaki et al. | |
| 5,144,497 A | | 9/1992 | Kato et al. | |
| 5,177,774 A | | 1/1993 | Suckewer et al. | |
| 5,222,113 A | | 6/1993 | Thieme et al. | |
| 5,291,339 A | | 3/1994 | Mochimaru et al. | |
| 5,311,565 A | | 5/1994 | Horikawa | |
| 5,384,817 A | * | 1/1995 | Crowther et al. | 378/84 |
| 5,719,915 A | | 2/1998 | Koike et al. | |
| 5,848,119 A | | 12/1998 | Miyake et al. | |
| 6,118,577 A | | 9/2000 | Sweatt et al. | |
| 6,469,827 B1 | | 10/2002 | Sweatt et al. | |
| 6,522,717 B1 | | 2/2003 | Murakami et al. | |
| 2004/0169835 A1 | * | 9/2004 | Goldstein | 355/67 |

FOREIGN PATENT DOCUMENTS

| | | |
|---|---|---|
| DE | 101 30 212 | 1/2003 |
| DE | 102 20 815 | 11/2003 |
| DE | 102 20 816 | 11/2003 |
| EP | 0 459 833 | 12/1991 |
| JP | 2001-116900 | 4/2001 |

OTHER PUBLICATIONS

Article entitled: "High Energy X–Ray Phase Contrast Microscopy Using A Circular Bragg–Fresnel Lens" Optics Communications, North–Holland Publishing Co. Amsterdam, NL, Bd. 135, Nr. 4, Feb. 15, 1997.

* cited by examiner

*Primary Examiner*—Fayez G. Assaf
(74) *Attorney, Agent, or Firm*—Reed Smith LLP

(57) ABSTRACT

Imaging system for a microscope based on extreme ultraviolet (EUV) radiation. The present invention is directed to a reflective imaging system for an x-ray microscope for examining and object in an object plane, wherein the object is illuminated by rays of a wavelength of less than 100 nm, particularly less than 30 nm, and is imaged in a magnified manner in an image plane. In the imaging system, according to the invention, for a microscope based on extreme ultraviolet (EUV) radiation with wavelengths in the range of less than 100 nm, with a magnification of 0.1× to 1000× and a structural length of less than 5 m, at least one of the imaging optical elements 2 and 3 in the beam path has a diffractive-reflective structure which is arranged on a spherical or plane area and has a non-rotationally symmetric, asymmetric shape. The arrangement according to the invention provides an imaging system which avoids the disadvantages of the prior art and ensures a high imaging quality. The manufacturing cost remains reasonable due to the exclusive use of spherical mirrors.

11 Claims, 2 Drawing Sheets

IMAGING SYSTEM FOR AN EXTREME ULTRAVIOLET (EUV) BEAM-BASED MICROSCOPE

CROSS-REFERENCE TO RELATED APPLICATION

This application claims priority of German Application No. 103 19 269.7, filed Apr. 25, 2003, the complete disclosure of which is hereby incorporated by reference.

BACKGROUND OF THE INVENTION a) Field of the Invention

The present invention is directed to a reflective imaging system for an x-ray microscope for examining an object in an object plane, wherein the object is illuminated by rays of a wavelength of less than 100 nm, particularly less than 30 nm, and is imaged in a magnified manner in an image plane.

b) Description of the Related Art

Microscopic examination of objects by x-ray radiation is becoming increasingly important especially in the semiconductor industry. Smaller structure sizes consistently require increasingly higher resolutions which can only be achieved by shortening the examination wavelength. This is particularly important in microscopic inspection of masks for the lithography process. Lithography with extreme ultraviolet (EUV) radiation represents the most promising solution for chip fabrication in the coming years.

Numerous different technical solutions for x-ray microscopes are known in the prior art.

U.S. Pat. Nos. 5,222,113; 5,311,565; 5,177,774 and EP 0 459 833 show x-ray microscopes in which zone plates are provided in the projection optics for imaging. These Fresnel zone plates are wave-optic imaging elements in which the light is diffracted at a system of concentrically arranged circular rings. The disadvantage in using Fresnel zone plates in the imaging systems with a plurality of optical elements in the area of the x-ray radiation is that Fresnel zone plates are transmissive component parts which result in large light losses because of the poor transmission in the x-ray range.

U.S. Pat. Nos. 5,144,497; 5,291,339 and 5,131,023 concern x-ray microscopes in which Schwarzschild systems are used as imaging systems. In these x-ray microscopes, the beam paths are laid out telecentric to the object under examination, which makes reflective imaging of objects difficult.

Another disadvantage in systems of the type mentioned above for use in examination of objects, particularly those used in the field of x-ray lithography, is their large structural length for achieving a sufficient imaging scale. This makes it more difficult to use them, for example, in inspection systems for examining masks in EUV projection exposure installations.

U.S. Pat. Nos. 6,469,827 and 5,022,064 disclose the use of diffractive elements for spectral selection through diffraction of x-ray radiation. In both of these references, however, these elements are only used for spectral separation and selection of x-ray radiation and not for correcting or improving imaging characteristics. This system is also laid out telecentric to the object, which impedes reflective imaging of objects.

The use of a diffractive optical element with a refraction-reinforcing and achromatizing effect for an objective, particularly a microscope objective, is described in DE-OS 101 30 212. However, an objective of this kind can not be used for EUV radiation because of the transmissive optical elements. Since EUV radiation, in contrast to UV radiation, is absorbed to a very great extent in virtually all materials, the use of optical components relying on transmission is not possible.

A reflective x-ray microscope for examining an object for microlithography in an object plane with radiation having a wavelength of less than 100 nm, particularly less than 30 nm, is known from JP 2001116900. The x-ray microscope disclosed in this application is a Schwarzschild system with a concave first mirror and a convex second mirror. In contrast to the systems described above, the beam path for examining the object is not telecentric to the object, so that reflective examination, e.g., of EUV reflection masks, is possible. A disadvantage in this system consists in the very large structural length for achieving large imaging scales.

Another x-ray microscope arrangement is described, for example, in the applications DE 102 20 815 and DE 102 20 816. In these applications, the imaging optics are designed as a purely reflective system and optimized with respect to small structural length with high magnifications. This is achieved through the use of highly aspherical mirrors, among other things. A disadvantage in these arrangements is that the manufacturing tolerances for the aspherical mirrors are extremely exacting in order to achieve high image quality and demanding requirements must therefore be imposed on the manufacturing technology and measuring technique.

The object of the present invention is to develop an imaging system for an x-ray microscope which avoids the disadvantages known in the prior art. Further, a high imaging quality is achieved at a reasonable manufacturing cost.

According to the invention, this object is met by the characterizing features of the independent claims. Preferred further developments and constructions are the subject of the dependent claims.

The proposed imaging system contains all of the optical elements associated with imaging optics and generates a corresponding intermediate image by means of extreme ultraviolet (EUV) radiation. This can be further processed, i.e., further magnified, by additional imaging systems.

The imaging system according to the invention can be used, for example, in photolithography through the use of EUV radiation of 13.5 nm.

The invention will be described in the following with reference to an embodiment example.

DESCRIPTION OF THE PREFERRED EMBODIMENTS

Figure 1:
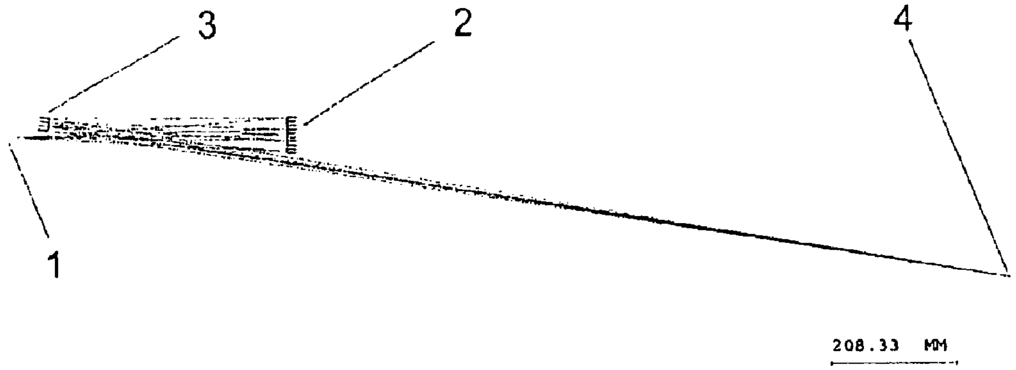
FIG. 1 shows a beam path in the first subsystem of the microscope.

In the imaging system according to the invention for a microscope based on extreme ultraviolet (EUV) radiation with wavelengths in the range of less than 100 nm with a magnification of 0.1× to 100× and a structural length of less than 5 m, at least one of the imaging optical elements 2 and 3 in the beam path has a diffractive-reflective structure. The diffractive-reflective structure is arranged on a spherical or plane area of one or both of the imaging optical elements 2 and 3. Concave or convex curvatures are possible as spherical areas.

The diffractive-reflective structures have a non-rotationally symmetric, asymmetric shape. In this specific case, the structures are asymmetric in the meridian plane (corresponds to the drawing plane) and are symmetric vertical to this plane. The diffractive-reflective structures can be described, for example, by the following polynomial of the phase distribution $\phi$: $\phi(x, y)=\Sigma a_i x^m y^n$, where x, y are coordinates; $a_i$ are coefficients; I is the summation index; and m, n are whole numbers.

In order to realize a total magnification of 5× to 1000×, the first imaging system is followed by another imaging system. The second imaging system can be based on x-ray imaging, electrooptical imaging, or imaging using a radiation above 200 nm. In the simplest case, the second imaging system can also be another imaging optical element with a spherically convex area without a diffractively acting structure.

The imaging system according to the invention is preferably provided for wavelengths in the range of less than 30 μm with a magnification of 5× to 1000× and a structural length of less than 3 m.

In another embodiment, the imaging system has two imaging optical elements 2 and 3, each with a diffractive-reflective structure. The first imaging optical element 2 has a concave area and the second imaging optical element 3 has a convex area for the respective diffractive-reflective structure. The imaging optical elements 2 and 3 are arranged in such a way that the optical paths intersect once. Further, the optical axis of the imaging system is inclined toward the object normal.

The imaging optical elements 2 and 3 can also be arranged in such a way that the optical paths do not intersect.

In a particularly advantageous construction, the imaging system according to the invention can be used as the basis for an inspection system for lithography masks. For applications in lithography, work is concentrated at wavelengths around 13.5 nm because efficient optics for the required exposure systems can only be produced at these wavelengths.

The first imaging optical element 2 with spherically concave area has, for example, a diffractive-reflective active structure with about 240 lines/mm and the second imaging optical element 3 with spherically convex area has a diffractive-reflective active structure with about 660 lines/mm. The imaging optical elements 2 ad 3 are arranged in such a way that the optical paths intersect once.

Figure 2:
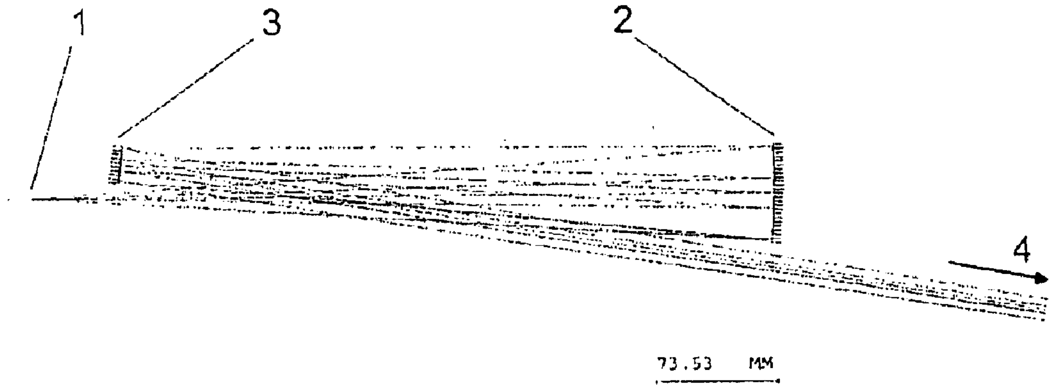
FIG. 2 shows an enlarged section of the beam path in the first subsystem of the microscope.
Figure 3:
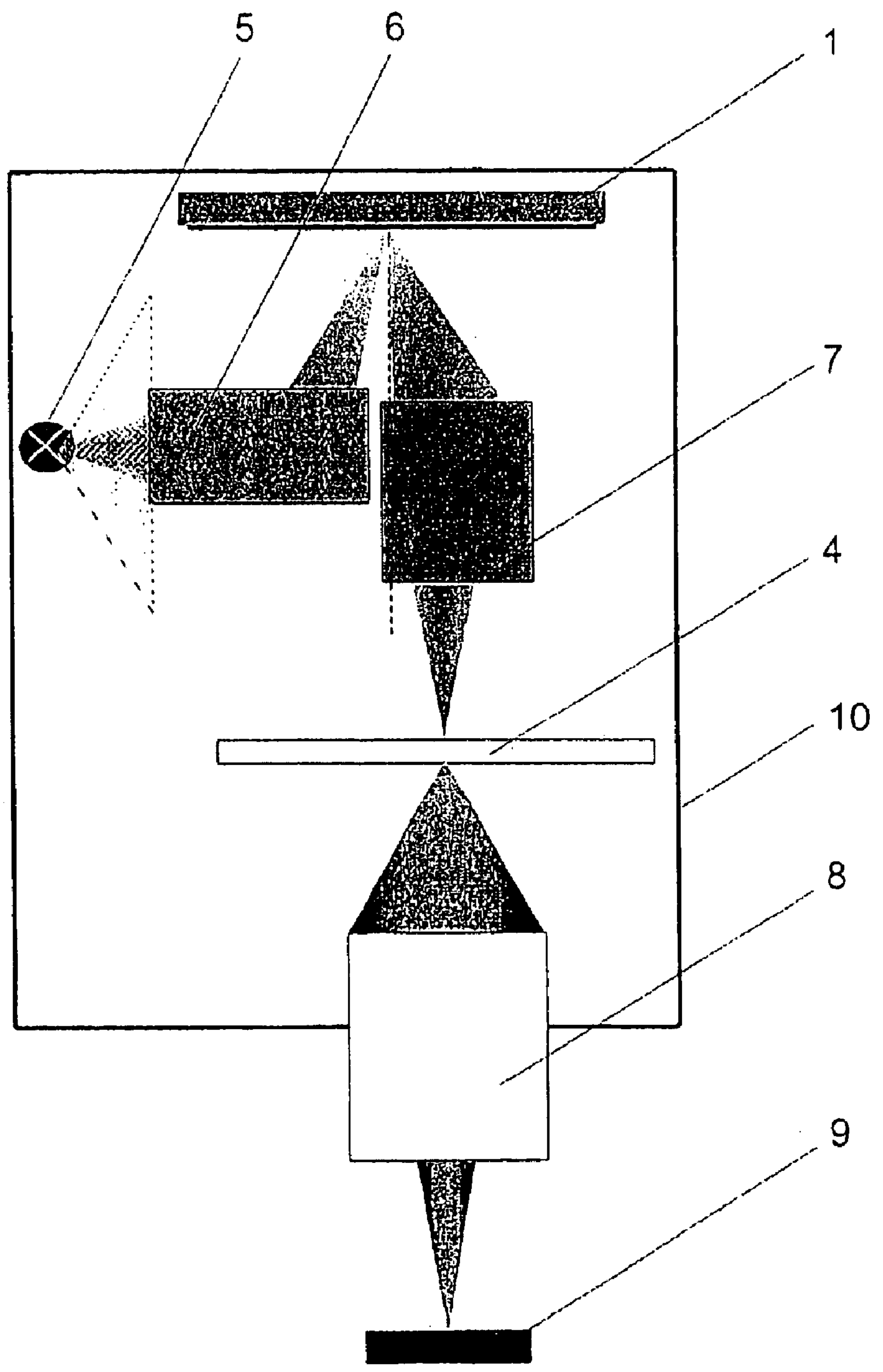
FIG. 3 shows a schematic overview of an inspection system for lithography masks based on EUV radiation.

FIG. 1 and FIG. 2 (enlarged section) show the corresponding beam paths in the imaging system proceeding from the object 1 under examination over the imaging optical elements 2 and 3 to the generated intermediate image 4. The beam path shown in the drawings refers to an imaging system for a microscope based on extreme ultraviolet (EV) radiation or a corresponding inspection system for lithography masks.

FIG. 4 shows a schematic overview of an inspection system for lithography masks based on EUV radiation.

In contrast to UV radiation, EUV radiation is absorbed to a very great degree in virtually all materials. Since the absorption length in air under normal pressure is far below 1 mm, EUV radiation can only propagate virtually without losses under vacuum over the distances needed for EUV lithography.

Proceeding from the radiation source 5, the EUV radiation is focused by the illumination optics 6 on the object 1. The EUV radiation reflected by the object 1 is focused by the imaging optics 7 as an intermediate image 4 on a converter layer or film. The partial system, according to the invention, from the object plane 1 to the intermediate image 4 to the converter film is also referred to as the first subsystem and is based entirely on EUV radiation.

The intermediate image 4 generated in this way can be further magnified, for example, by a second subsystem. The second subsystem can be based on EUV radiation as well as on other wavelengths.

The EUV radiation is converted, for example, into VIS radiation by the converter film (intermediate image 4). This VIS radiation is imaged on a camera chip 9 by additional imaging optics 8 which are used as a second subsystem and which are formed at the same time as a window of the vacuum chamber 10. The camera chip 9 is used for monitoring irradiation.

The arrangement according to the invention provides an imaging system which avoids the disadvantages known from the prior art and ensures a high imaging quality. The manufacturing cost remains reasonable due to the exclusive use of spherical mirrors.

Microscopic examination of objects with x-ray radiation, particularly with extreme ultraviolet (EUV) radiation, is becoming increasingly important especially in the semiconductor industry. Smaller structure sizes consistently require increasingly higher resolutions which can only be achieved by shortening the examination wavelength. This is particularly important in microscopic inspection of masks for the lithography process.

X-ray microscopes are especially important in methods such as AIMS (aerial imaging measurement). In the AIMS method, the lithography stepper is simulated by a more economical and simpler microscope arrangement. In this connection, it is important that the imaging is generated with the same wavelength of, e.g., 13.5 nm, the same illumination conditions and the same image quality as in a EUV stepper. However, in contrast to the stepper, the image field with approximately 10 μm instead of several mm is substantially smaller. Another difference consists in that the masks are typically imaged on a camera with a magnification of 10× to 1000×.

While the foregoing description and drawings represent the present invention, it will be obvious to those skilled in the art that various changes may be made therein without departing from the true spirit and scope of the present invention.

What is claimed is:

1. An imaging system for a microscope based on extreme ultraviolet (EUV) radiation having a single wavelength in the range of less than 100 nm, comprising:

a plurality of imaging optical elements, the imaging system having a structural length of less than 5 m; and at least one of the imaging optical elements in the beam path having a diffractive-reflective structure that reflects the EUV radiation having the single wavelength.

2. The imaging system according to claim 1, wherein the diffractive-reflective structure is arranged on a spherical or plane area and has a non-rotationally symmetric, asymmetric shape.

3. The imaging system according to claim 2, wherein the spherical areas are concave or convex.

4. The imaging system according to claim 1, wherein two imaging optical elements are provided respectively with a diffractive-reflective structure, wherein the first imaging optical element has a concave area and the second imaging optical element has a convex area for the respective diffractive-reflective structure.

5. The imaging system according to claim 1, wherein the optical axis of the imaging system is inclined toward the object normal.

6. The imaging system according to claim 1, wherein the imaging optical elements are arranged in such a way that the optical paths intersect at least once.

7. The imaging system according to claim 1, wherein the imaging optical elements are arranged in such a way that the optical paths do not intersect.

8. The imaging system according to claim 1, wherein another imaging system is arranged downstream in order to realize a total magnification of 5× to 10,000×.

9. An inspection system for lithography masks based on an imaging system according to claim 1, wherein a first imaging optical element with spherically concave area has a diffractive-reflective active structure with about 240 lines/mm and a second imaging optical element with spherically convex area has a diffractive-reflective active structure with about 660 lines/mm, and the optical paths intersect once.

10. An imaging system for a microscope based on extreme ultraviolet (EUV) radiation with wavelengths in the range of less than 100 nm, comprising:

a plurality of imaging optical elements, the imaging system having a structural length of less than 5 m; and at least one of the imaging optical elements in the beam path having a diffractive-reflective structure;

wherein the plurality of imaging optical elements includes two imaging optical elements that are provided respectively with a diffractive-reflective structure, wherein one of the two imaging optical elements has a concave area and the other of the two imaging optical elements has a convex area for the respective diffractive-reflective structure.

11. An imaging system for a microscope based on extreme ultraviolet (EUV) radiation with wavelengths in the range of less than 100 nm, comprising:

a plurality of imaging optical elements, the imaging system having a structural length of less than 5 m; and at least one of the imaging optical elements in the beam path having a diffractive-reflective structure;

wherein another imaging system is arranged downstream in order to realize a total magnification of 5× to 10,000×.

* * * * *